(12) United States Patent
Chang et al.

(10) Patent No.: US 7,288,343 B2
(45) Date of Patent: Oct. 30, 2007

(54) STRUCTURE AND METHODS OF FABRICATING BINDING LAYERS FOR A LI-ION POLYMER BATTERY

(75) Inventors: Tsun-Yu Chang, Taichung (TW); Prashant N. Kumta, Pittsburgh, PA (US); Chun-Chieh Chang, Pittsburgh, PA (US)

(73) Assignee: Changs Ascending Enterprise Co., Ltd., Taichung (TW)

( * ) Notice: Subject to any disclaimer, the term of this patent is extended or adjusted under 35 U.S.C. 154(b) by 659 days.

(21) Appl. No.: 10/664,106

(22) Filed: Sep. 17, 2003

(65) Prior Publication Data

US 2004/0053123 A1   Mar. 18, 2004

Related U.S. Application Data

(62) Division of application No. 09/828,436, filed on Apr. 6, 2001, now Pat. No. 6,727,017.

(51) Int. Cl.
*H01M 2/16* (2006.01)
*H01M 2/14* (2006.01)

(52) U.S. Cl. .................... 429/247; 429/129
(58) Field of Classification Search .......... None
See application file for complete search history.

(56) References Cited

U.S. PATENT DOCUMENTS

| | | | |
|---|---|---|---|
| 4,086,401 A | 4/1978 | Sundberg et al. | 429/145 |
| 5,225,296 A * | 7/1993 | Ohsawa et al. | 429/213 |
| 5,348,824 A | 9/1994 | Duval | 429/192 |
| 5,362,581 A | 11/1994 | Chang et al. | 429/249 |
| 5,449,576 A | 9/1995 | Anani | 429/191 |
| 5,536,278 A | 7/1996 | St-Amant et al. | 29/623.3 |
| 5,582,931 A * | 12/1996 | Kawakami | 429/127 |
| 5,688,293 A | 11/1997 | Oliver et al. | 29/623.1 |
| 5,691,047 A | 11/1997 | Kurauchi et al. | 428/315.7 |
| 5,705,259 A | 1/1998 | Mrotek et al. | 428/209 |
| 5,778,515 A | 7/1998 | Menon | 28/623.4 |
| 5,981,107 A | 11/1999 | Hamano et al. | 429/231.95 |
| 6,024,773 A | 2/2000 | Inuzuka et al. | 29/623.4 |
| 6,136,471 A | 10/2000 | Yoshida et al. | 429/218.1 |
| 6,287,720 B1 | 9/2001 | Yamashita et al. | 429/131 |
| 6,413,675 B1 | 7/2002 | Harada et al. | 429/300 |
| 2002/0102455 A1 | 8/2002 | Daroux et al. | 429/144 |

FOREIGN PATENT DOCUMENTS

WO    WO 97/08763    *  3/1997

* cited by examiner

*Primary Examiner*—Patrick Joseph Ryan
*Assistant Examiner*—Julian Mercado
(74) *Attorney, Agent, or Firm*—Kratz, Quintos & Hanson, LLP

(57) ABSTRACT

A Li-ion polymer battery and methods for its fabrication. A first and second layer, of a polymer/particulate material composition, separate and bind each anode and cathode. The polymer of the first layer and its associated solvent differ from the polymer of the second layer and its associated solvent. Solubility requirements are such that the polymer of the first layer is non-soluble in the solvent of the second layer, and the polymer of the second layer is non-soluble in the solvent of the first layer. The polymers and particulate materials of the layers form a porous structure for containing the electrolyte of the battery so as to eliminate the need for a substantial case for enclosing the battery.

21 Claims, 17 Drawing Sheets

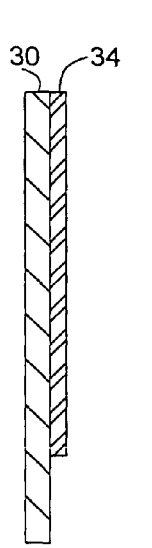
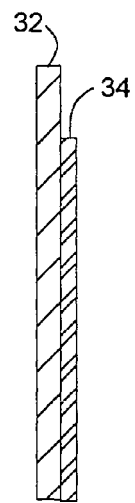
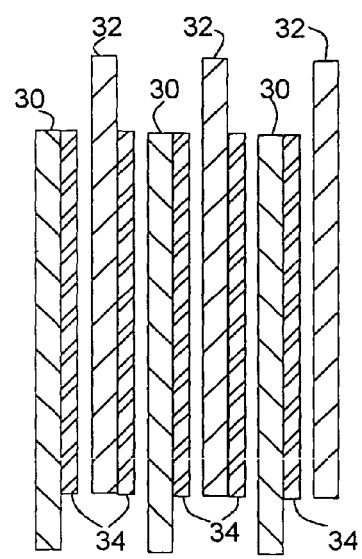
FIG. 5a  FIG. 5b  FIG. 5c
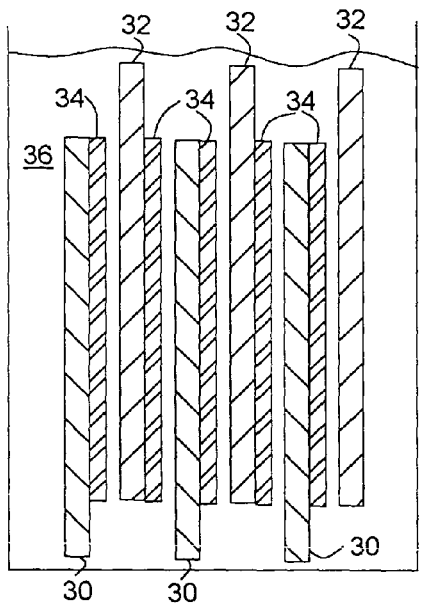
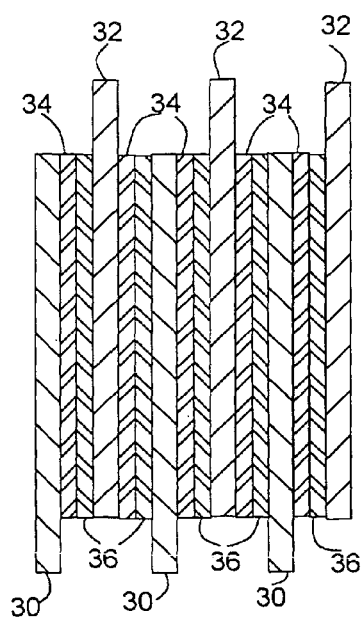
FIG. 5d  FIG. 5e

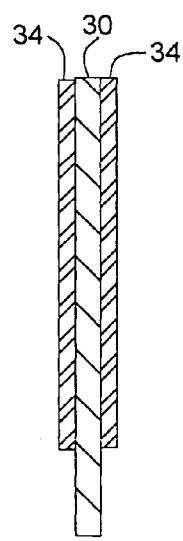 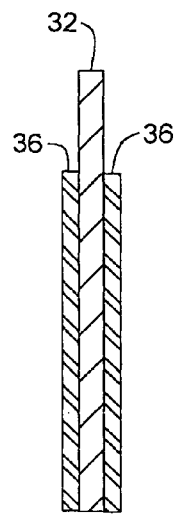 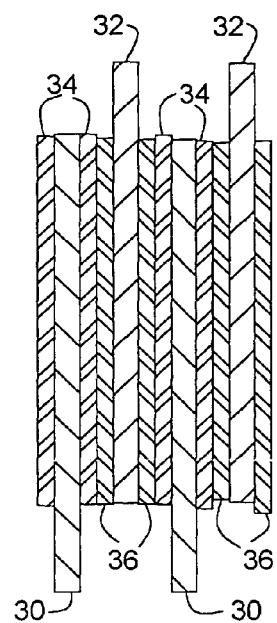
FIG. 7a    FIG. 7b    FIG. 7c
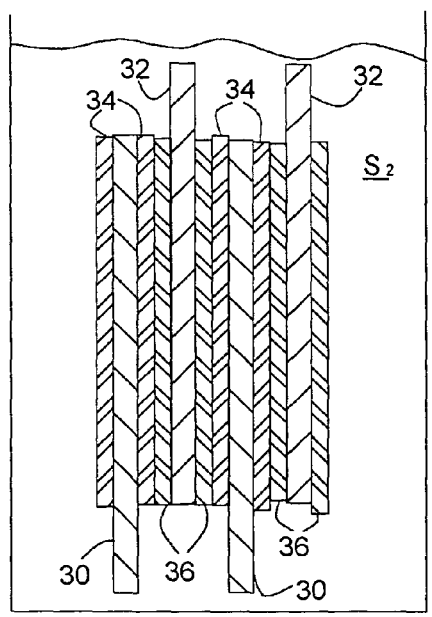 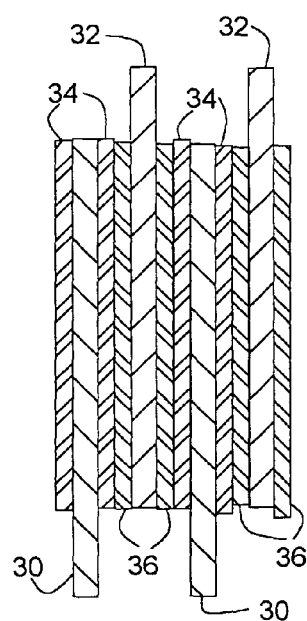
FIG. 7d
FIG. 7e

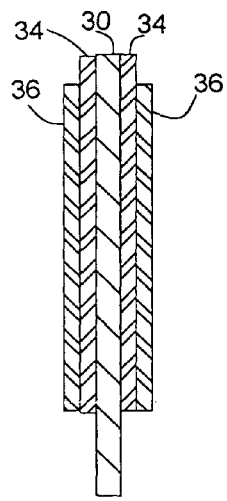  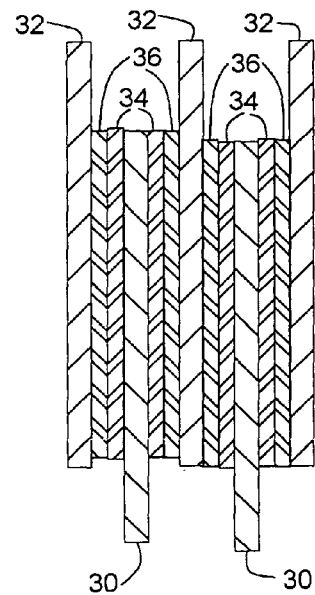
FIG. 8a  FIG. 8b  FIG. 8c
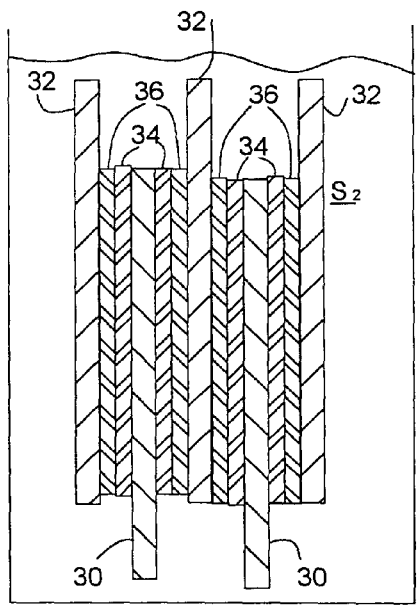 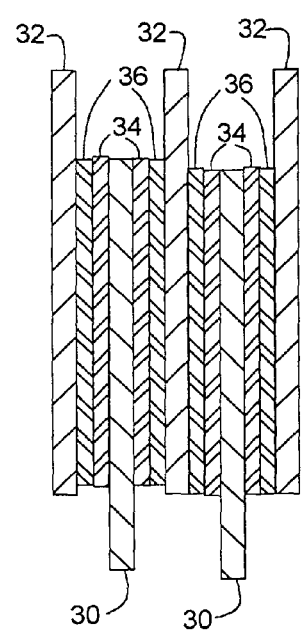
FIG. 8d  FIG. 8e

STRUCTURE AND METHODS OF FABRICATING BINDING LAYERS FOR A LI-ION POLYMER BATTERY This application is a Division of prior application Ser. No. 09/828,436 filed Apr. 6, 2001 now U.S. Pat. No. 6,727,017.

FIELD OF THE INVENTION

The present invention relates to a lithium-ion secondary battery wherein anodes and cathodes are separated and bound by two different porous layers of polymeric materials containing particulate matter, and methods for fabricating the same.

BACKGROUND OF THE INVENTION

Lithium-ion polymer batteries are fabricated by various methods. In U.S. Pat. No. 5,536,278 an electrolyte film, previously prepared, is heated and laminated to a first electrode. The second electrode is then laminated to the laminated first electrode.

In U.S. Pat. No. 5,778,515 an electrode film and a separator film are formed then laminated after use of a pre-lamination solvent on the surface at least one of the films.

In U.S. Pat. No. 6,024,773 a separator film is coated on both sides with a binder resin solution so as to bond the electrodes with the separator film separating them.

In U.S. Pat. No. 5,348,824 polymer based amorphous compositions are melt extruded in the form of a thin film directly on the positive electrode of a lithium battery.

In all of the processes in which a sheet or film is formed, the composition of the separator material is limited to polymers having satisfactory mechanical strength for forming a thin film and for carrying out the laminating process with the electrodes. Use of particulate material in the polymer, to any great extent, is nearly impossible with any polymer as the mechanical strength is decreased further with the addition of the particulate material. In melt extended polymers, the porosity is difficult to control and is typically low.

Those disadvantages and other are overcome with use of the present invention.

SUMMARY OF THE INVENTION

The present invention is concerned with a Li-ion polymer battery and methods for its fabrication. Two layers of differing polymeric materials are provided, in non-sheet form, to separate and bind adjacent anodes and cathodes (electrodes) of the battery. The layers contain a particulate material to increase porosity of the layers. The differing polymeric materials have specific solubility requirements which are described below.

The battery has at least one anode and at least one cathode which is in opposing spaced relationship to each anode. Two layers of differing porous separators/binders are intermediate each anode and cathode to maintain the spacing and to bind each anode to each cathode. A non-aqueous electrolyte fills the pores of the separators/binders. Each separator/binder consists of a polymer and particulate material. A first separator/binder is made up of polymer $P_1$ and particulate material $M_1$; the second separator/binder is made up of polymer $P_2$ and particulate material $M_2$. The polymers and particulate materials must have solubility properties such that $P_1$ is soluble in solvent $S_1$, $P_2$ is soluble in solvent $S_2$, $P_1$ is non-soluble in solvent $S_2$, $P_2$ is non-soluble in solvent $S_1$, $M_1$ is non-soluble in $S_1$, and $M_2$ is non-soluble in $S_2$.

Preferred structures of the batteries are a prismatic form (stacked) and a cylindrical form (wound). Fabrication is carried out by three fabricating methods. In all of the methods the first separator/binder, in which the polymer is dissolved in a solvent, is applied to the electrodes in such a manner that a single layer of the first separator/binder will be present between each anode and cathode in the completed battery. The first separator/binder is then dried. The second separator/binder is provided in differing manners in each of the three methods, however the polymer of the second separator/binder is in at least a partially dissolved condition while the electrodes are in a stacked form in order that the electrodes are bound in either the prismatic or cylindrical form when the second separator/binder is dried by evaporation of the solvent $S_2$.

In a first method the electrodes are stacked while the second separator/binder is not fully dried and in a tacky condition.

In a second method the electrodes are stacked with only the first separator/binder between them and the second separator/binder is infiltrated to between the electrodes and then dried.

In a third method the electrodes are stacked with a first and a second separator/binder, in a dried condition, between them; solvent $S_2$ is then infiltrated to between the electrodes so as to at least partially dissolve polymer $P_2$ such that when dried the electrodes will be bound together.

Final fabrication of the batteries, in all three methods, includes providing a non-aqueous electrolyte to fill the pores of the separators/binders and packaging the electrodes and electrolyte.

BRIEF DESCRIPTION OF THE DRAWING

In order that the invention may be more readily understood, reference is made to the accompanying drawings in which:

FIGS. 5a, 5b, 5c, 5d and 5e are drawings for describing fabricating steps carried out for the second method of fabrication of the invention for a prismatic battery;

FIGS. 7a, 7b, 7c, 7d and 7e are drawings for describing fabricating steps carried out for the third method of fabrication of the invention for a prismatic battery;

FIGS. 8a, 8b, 8c, 8d and 8e are drawings for describing alternative fabricating steps to steps shown in FIGS. 7a-7e carried out for the third method of fabrication of the invention for a prismatic battery;

DETAILED DESCRIPTION OF THE PREFERRED EMBODIMENTS

The battery of the present invention is a rechargeable battery having at least one anode and one cathode (electrodes) in spaced relationship and a liquid electrolyte disposed in the space between them in order that ions can pass freely between the anode and the cathode. To be of practical use, the battery of a prismatic form consists of a plurality of anodes and cathodes, in spaced relationship, with the liquid electrolyte occupying each space. Two possible configurations for Li-ion batteries are described: 1) a battery having substantially flat anodes and cathodes stacked in an alternating arrangement, referred to as "prismatic" battery, and 2) a battery having a single elongated anode and a single elongated cathode stacked and then wound in a coil fashion, usually about a core, referred to generally as "cylindrical" battery.

In order to maintain the spaced relationship and avoid contact and a short circuit between the anodes and the cathodes, and, in order to bind the anodes and the cathodes into a structure requiring no external means for support, two layers of separator/binder, configured to have a high level of porosity, are provided between each anode and cathode. Both of the layers act as separators and as binders and contain the electrolyte in their pores.

Figure 1:
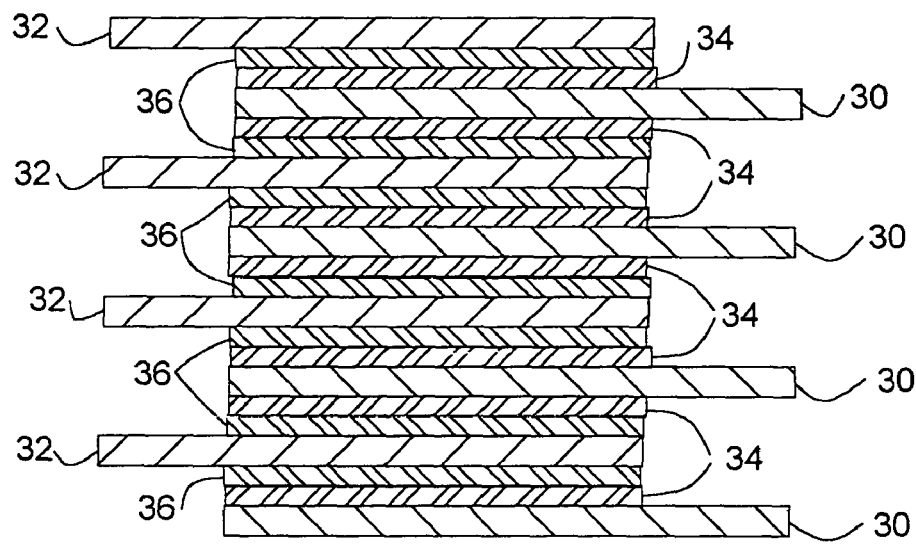
FIG. 1 is a vertical section of a portion of a battery of the invention showing the alternating anodes and cathodes and the intermediate layers of separator/binder, the battery having a prismatic structure.

Referring to FIG. 1, an example of the prismatic arrangement, anodes 30 are stacked in an alternating manner with cathodes 32. The cathodes can consist of any known cathode structure, for example an aluminum foil having formed on its surfaces a positive electrode active material layer such as complex oxides of lithium such as $LiCoO_2$. Other active material layers can consist of lithiated manganese oxide, lithiated nickel oxide, and combinations thereof. The anode can consist of any known anode structure, for example a copper foil having formed on its surfaces a carbonaceous material such as carbonaceous graphite. Other examples of electrodes include metallic lithium, lithium, lithium alloys, aluminum, and lithium intercalation materials such as carbon, petroleum coke, activated carbon, graphite, and other forms of carbon known in the art. Other substrate foils can consist of gold, nickel, copper alloys, and copper plated materials.

A first separator/binder layer 34 and a second separator/binder layer 36, made up of particulate materials and polymers $P_1$ and $P_2$ respectively, fill the space between the anodes and cathodes.

Figure 2:
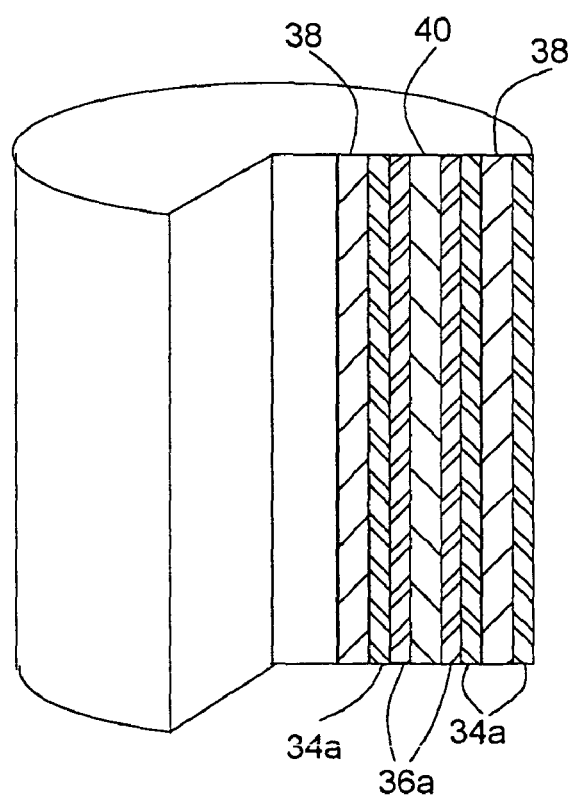
FIG. 2 is a schematic drawing of a battery of the invention, the battery having a cylindrical structure.

In FIG. 2, a cylindrically shaped arrangement of an anode and a cathode is shown having anode 38, cathode 40 and two separator/binder layers 34a and 36a in the space between the anode and cathode. The anode and cathode material can be similar to those described for the prismatic arrangement.

Referring to FIG. 1, intermediate each anode and cathode are two layers of separators/binders, 34 and 36 which maintain a separation between each anode and cathode and act as a binder to hold the anodes and cathodes in position. No means external to the electrodes are necessary to maintain the structure of the battery. The separators/binders are applied to the electrodes as a liquid and the method of application is described below. The liquid separators/binders are prepared by dissolving polymers in a solvent to obtain a polymeric solution followed by adding a particulate material to the solution. For example, PVC (polyvinylchloride) is dissolved in THF (tetrahydrofuran). If polymer $P_1$ is dissolved in solvent $S_1$, and polymer $P_2$ is dissolved in solvent $S_2$, a requirement of the invention is that $P_1$ is soluble in $S_1$ and non-soluble in $S_2$; and that $P_2$ is soluble in $S_2$ and non-soluble in $S_1$. For example, $P_1$ could be PVC; $S_1$ could be THF; $P_2$ could be PEO (polyethylene oxide); and $S_2$ could be methanol. The polymeric materials can be roughly categorized as hydrophilic and hydrophobic. The following tables present possible combinations that can be used which follow the above requirements. The tables do not include all possible combinations. Any hydrophilic polymeric material from Table I can be used with any hydrophobic polymeric material from Table II.

TABLE I

| (Hydrophilic) | |
|---|---|
| POLYMER | SOLVENT |
| PEO (polyethylene oxide) | methanol |
| PPO (polypropylene oxide) | methanol |
| polycarbonate | methanol/chloroform |
| PMMA (polymethyl methacrylate) | ethanol |
| PVP (polyvinyl pyrrolidone) | methanol |

TABLE II (Hydrophobic)

| POLYMER | |
|---|---|
| PE/PP (polyethylene/polypropylene) | heptane |
| PVC (polyvinylchloride) | tetrahydrofuran |
| polystyrene | tetrahydrofuran |
| PAN (polyacrylonitrile) | DMF (dimethyl sulfoxide) |
| PAN (polyacrylonitrile) | DMSO (dimethyl sulfoxide) |

It is also possible to select polymer/solvent combinations for both the first and second separator/binder layers from within either Table I or Table II and still comply with the solubility requirements stated above.

As discussed above, for a Li-ion battery to operate, it is necessary that an electrolyte be present in the separation between the electrodes in order that ions can move freely between the electrodes. In order to provide porosity in each separator/binder a particulate material is added to the dissolved polymer prior to its application to the electrodes. A preferred particulate material is borosilicate glass fibers. Other materials can include particulate materials such as: oxide particles such as magnesium oxide, calcium oxide, strontium oxide, barium oxide, boron oxide, aluminum oxide, silicon oxide; synthetic or natural zeolites; silicates such as borosilicate, calcium silicate, aluminum polysilicates; cellulosic materials such as wood flours, and glass materials such as microbeads, hollow microspheres, flakes; or particulate materials in the fiber form such as: polyester fibers, nylon fibers, rayon fibers, acetate fibers, acrylic fibers, polyethylene fibers, polypropylene fibers, polyamide fibers, polybenzimidazole fibers, borosilicate glass fibers, and wood fibers.

An example of a liquid separator/binder for application to an electrode is: 0.5 gm of PVC dissolved in 20 gm of THF to which 9.5 gm of borosilicate is added. In a preferred embodiment the borosilicate is prepared as glass fibers which have been processed in a ball mill for approximately 24 hours. After the ball mill processing the fibers are in a powder form.

A second example of a liquid separator/binder for application to an electrode is: 1 gm of PEO dissolved in 30 gm of methanol with 5 gm of borosilicate added.

A separator/binder, prepared as indicated above, upon being applied to the electrode and dried, produces a porous layer wherein the particulate material is coated with the polymer and bound to the surface of the electrode. The solvent of the applied material is substantially completely evaporated in the drying process leaving voids between the polymer-coated particles as the polymer shrinks back as the solvent evaporates. In a subsequent fabricating step a liquid electrolyte is provided which fills the voids of each separator/binder layer between the electrodes.

FIGS. 3a through 12c show various steps for three different methods of fabricating Li-ion batteries of the invention. Prismatic type batteries are described first, followed by cylindrically structured batteries.

Figure 3A:
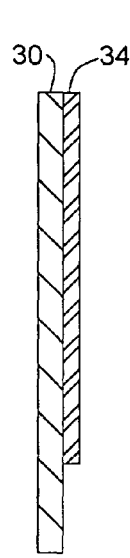
FIGS. 3a, 3b, 3c are drawings for describing fabricating steps carried out for the first method of fabrication of the invention for a prismatic battery.

In a first step of the first method, FIG. 3a, anode 30 is coated on one side with a first separator/binder 34 and dried. A preferred method of coating which applies to all the following examples is to prepare the separator/binder by combining the polymer, the solvent, and the particulate material and continually stirring the mixture for a period of about 8 to 12 hours. The stirring is carried out until the polymer and the particulate material in suspension is homogeneous. The length of time for stirring is dependent upon the polymer type and the particulate material. Following preparation of the separator/binder, a bar coating process, using a metallic net to control thickness, is carried out. The thickness of the coating is controlled to be between 10 and 200 μm. Preferably, the thickness is controlled to be between 30 and 60 μm. With the use of metallic nets of differing thickness the coating thickness can be regulated. However, other methods resulting in a similar uniform coating can be used. In the present first method of fabricating, following coating of the first separator/binder, 34, drying is carried out to evaporate the solvent. Complete drying however is not necessary at this stage of fabrication.

Figure 3B:
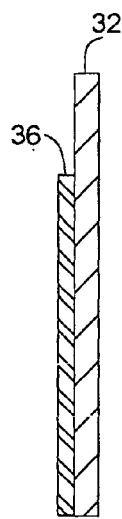
Figure 3C:
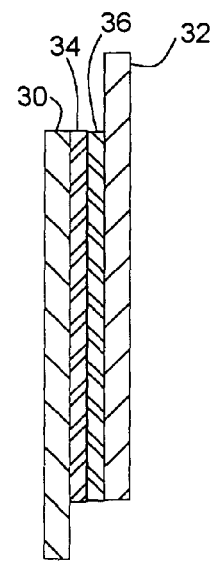

In a second step of the first method, FIG. 3b, the cathode 32 is coated with a second separator/binder 36 prepared in the same manner as discussed above. However, this coating is not completely dried. While the second separator/binder, 36, is still at least tacky on cathode 32, the anode 30, having the dried coating of the first separator/binder, 34, is layered with the cathode 32 as shown in FIG. 3c so as to bind the stack of electrodes. The process is repeated to obtain the number of layers desired.

The polymers $P_1$ and $P_2$ of the first and second separator/binder respectively (FIGS. 3a-3c) have the solubility restrictions discussed above. Since polymer $P_1$ is not soluble in the solvent $S_2$ of polymer $P_2$, polymer $P_1$ is not dissolved when placed in contact with the liquid (at least tacky) polymer $P_2$ in the step shown in FIG. 3c. As a result $P_1$ remains solid in the uniform layer as applied and thus guarantees the separation between the electrodes. Additionally the layer of the second separator/binder, 36, containing polymer $P_2$ adds to the separation between the electrodes. As can be seen in FIG. 3c anode 30 is bound to the first separator/binder layer 34, the first separator/binder layer 34 is bound to the second separator/binder layer 36, and the second separator/binder layer 36 is bound to cathode 32. No additional support means is required to maintain the structure of the battery. Additional alternating anodes and cathodes can be added in a similar manner to produce a battery of a selected size and capacity. After assembling the desired number of electrodes, the assembly is preferably dried under a vacuum at 120 C. for 8 hours. The coatings applied to each electrode cover the area necessary to be opposed by the adjacent electrode. The uncoated portions of the electrodes extend from sides of the stack, as shown in FIG. 1, and are connected electrically in subsequent steps of the assembly as is known in the art.

The specific sequence of coating and relative arrangement of the two separator/binder layers as shown in FIGS. 3a-3c is not unique. Any procedure resulting in a first separator/binder layer and a second separator/binder layer between each anode and cathode is acceptable. However, during assembly the first separator/binder layer must be applied and dried and the second layer must be at least tacky when stacking takes place.

Figure 4A:
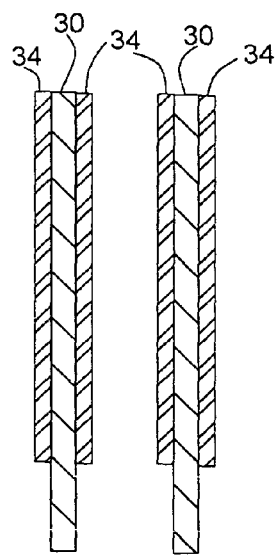
FIGS. 4a, 4b, 4c are drawings for describing alternative fabricating steps to steps shown in FIGS. 3a-3c carried out for the first method of fabrication of the invention for a prismatic battery.
Figure 4B:
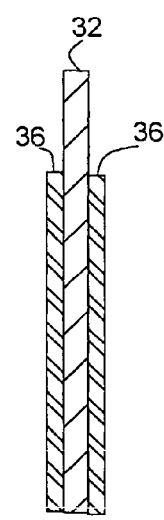
Figure 4C:
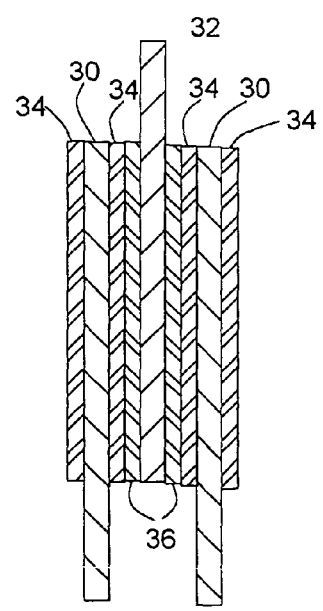

An alternate first method of fabrication is shown in FIGS. 4a to 4c. In FIG. 4a two anodes 30 are coated with the first separator/binder 34 on both sides and dried. In FIG. 4b one cathode 32 is coated with the second separator/binder layer 36. In the final step, FIG. 4c, the anodes 30 and cathode 32 are stacked while the second separator/binder 36 is at least still tacky. Additional layers can be added in a similar manner.

Steps described above, (FIGS. 3a-3c), along with subsequent steps to complete fabrication of the battery include:

1) coating one side of one electrode (e.g. anode) with the first separator/binder layer 34

2) drying the first layer 34

3) coating one side of one opposite electrode (e.g. cathode) with the second separator/binder layer 36

4) stacking the electrodes while the second layer, 36, is still at least tacky 5) adding additional anodes and cathodes in a similar manner for a selected number of electrodes 6) drying the completed stack of electrodes 7) providing the desired electrical connections to the electrodes 8) infiltrating an electrolyte to the pores of the two separator/binder layers of the stack of electrodes 9. placing the stacked electrodes into a suitable container and sealing the container In order to prevent moisture from being present within the sealed container, steps 8 and 9 are preferably carried out in a dry room. Electrolytes, discussed below, are non-aqueous, and the presence of moisture is detrimental to the operation of the battery.

In the above examples and following examples, the percent of particulate material in the first separator/binder (by weight) is in the range of 50-98%; the percent of particulate material in the second separator/binder (by weight) is in the range of 50-98%. The preferred percent for the first separator/binder is in the range of 80-97%. The preferred percent for the second separator/binder is in the range of 70-92%.

A second method of fabricating a battery of the invention is presented in FIGS. 5a through 5e. In a first step of the second method, FIG. 5a, anode 30 is coated with the first separator/binder, 34, and dried. In step 2, FIG. 5b, cathode 32 is coated with the first separator/binder 34 and dried. Steps 1 and 2 are repeated for a selected number of anodes and cathodes. In step 3, FIG. 5c, the prepared anodes and cathodes are loosely stacked in a manner such that a single layer of the first separator/binder, 34, is present between each alternating anode 30 and cathode 32. In step 4, FIG. 5d, the second separator/binder, 36, is infiltrated to spaces between the dried layers 34 and opposed uncoated electrode surfaces. The step can be carried out by immersion in the liquid or by any other means. FIG. 5e shows the completed assembly having alternating anodes 30 and cathodes 32 with a layer of each separator/binders 34 and 36 between them. The requirements of polymers $P_1$ and $P_2$ of first and second separator/binders 34 and 36, stated above, are especially important in the present method in order that the dried first layer with polymer $P_1$ remains undissolved and maintained at the uniform thickness which was applied in steps 5a and 5b.

Figure 6A:
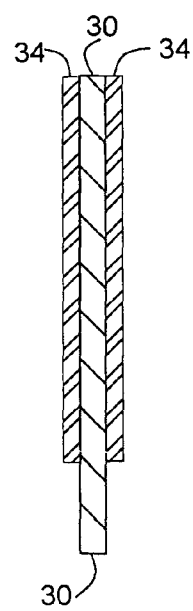
FIGS. 6a, 6b, 6c and 6d are drawings for describing alternative fabricating steps to steps shown in FIGS. 5a-5e carried out for the second method of fabrication of the invention for a prismatic battery.
Figure 6B:
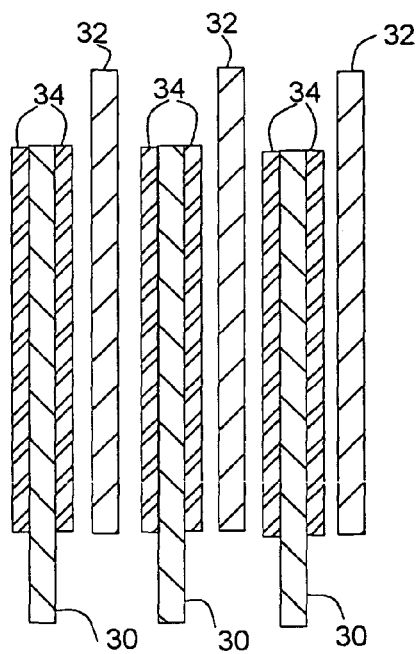
Figure 6C:
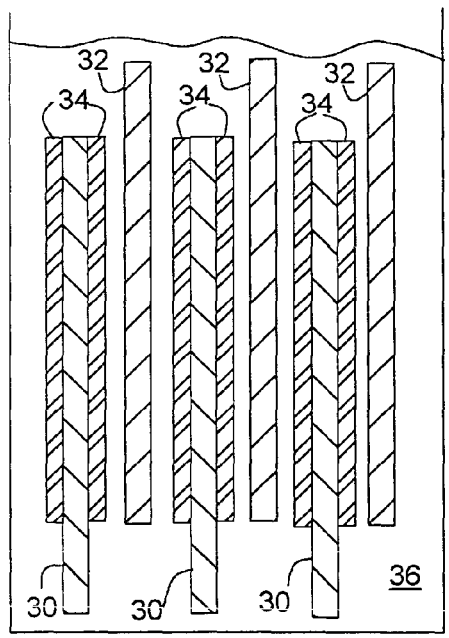
Figure 6D:
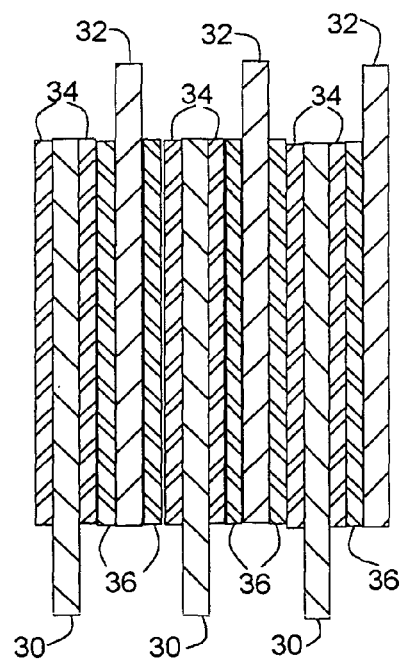

FIGS. 6a-6d show an alternative manner of fabrication using the second method. In FIG. 6a anode 30 is coated with the first separator/binder 34 on both sides and dried. A plurality of additional anodes are likewise prepared. In a second step, FIG. 6b, the prepared anodes are loosely stacked, in an alternating manner with non-coated cathodes. In a third step, FIG. 6c, the loosely stacked electrodes are infiltrated with the second separator/binder so as to add a second separator/binder layer 36 between each dried first separator/binder layer 34 and the non-coated surface of cathode 32 as shown in FIG. 6d. This same process can be used, for example, by coating cathodes and stacking them with non-coated anodes.

Steps described above (FIGS. 6a-6d), along with subsequent steps to complete fabrication of the battery include:

1) coating both sides of electrodes (e.g. anodes) with the first separator/binder layer 34

2) drying the first layer 34

3) loosely stacking the coated electrodes in an alternating manner with non-coated electrodes (e.g. cathodes)

4) infiltrating the loosely stacked electrodes with the second separator/binder 36

5) drying the stack of electrodes 6) providing the desired electrical connections to the electrodes 7) infiltrating an electrolyte to the pores of the two layers of the stack of electrodes 8) placing the stacked electrodes into a suitable container and sealing the container Steps 7 and 8 are preferably carried out in a dry room.

A third method of fabricating a battery of the invention is presented in FIGS. 7a-7e. In FIG. 7a anode 30 is coated on both sides with the first separator/binder 34 and dried. In a second step, FIG. 7b, cathode 32 is coated on both sides with the second separator/binder 36 and dried. The anodes and cathodes are then stacked in an alternating manner as shown in FIG. 7c. In a next step the stacked electrodes are infiltrated with the solvent $S_2$ of the second separator/binder 36 by immersion of the stack in solvent $S_2$ so as to dissolve at least a portion of the polymer $P_2$ as shown in FIG. 7d. In a final step, FIG. 7e, the stacked electrodes are dried so as to bind the electrodes together. The completed stack of electrodes have a layer of the first separator/binder and a layer of the second separator/binder between each anode and cathode.

FIGS. 8a-8e show an alternate manner of fabrication using the third method. In FIG. 8a anode 30 is coated on both sides with the first separator/binder 34 and dried. Then, the second separator/binder 36 is applied on top of the first separator/binder and dried.

FIG. 8b shows cathode 32 which is free of any coating of a separator/binder. In FIG. 8c a plurality of coated anodes and non-coated cathodes are stacked in an alternating manner. In a next step, FIG. 8d, the stacked electrodes are emersed in solvent $S_2$ so as to dissolve at least a portion of the second separator/binder 36. And, in a final step, FIG. 8e, the assembly is dried thereby bonding each anode to each cathode.

Steps of FIGS. 7a-7e along with subsequent steps to complete the fabrication of the battery include:

1) coating both sides of an electrode (e.g. anode) with the first separator/binder 34

2) coating both sides of an unlike electrode (e.g. cathode) with the second separator/binder 36

3) repeating steps 1 and 2 for a plurality of anodes 30 and cathodes 32

4) stacking a plurality of coated electrodes 5) infiltrating solvent $S_2$ of polymer $P_2$ 6) drying the stack of electrodes 7) providing the desired electrical connections to the electrodes 8) infiltrating an electrolyte to the pores of the two layers of the stacked electrodes 9) placing the stacked electrodes into a suitable container and sealing the container Steps 8 and 9 are preferably carried out in a dry room.

Although it is shown to apply the second separator/binder on top of the first separator/binder only in the third method of fabrication, a similar procedure can also be carried out with the first method. In the first method, the second separator/binder is not completely dried prior to performance of the next step.

Figure 9:
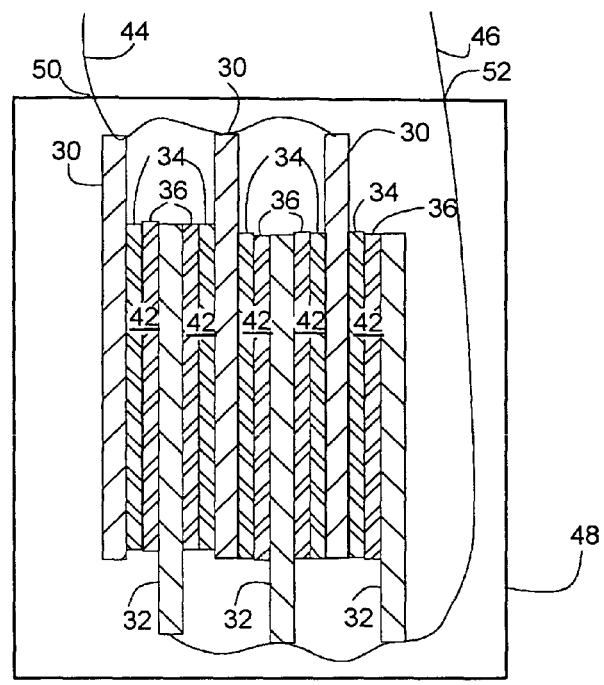
FIG. 9 is a schematic drawing of completely fabricated battery of the invention.

A fully fabricated battery of the invention is shown schematically in FIG. 9. Stacked anodes, 30, and cathodes, 32, have one layer of separator/binder 34 and one layer of separator/binder 36 between each electrode. The stacked electrodes and layers of separator/binder can be prepared by any of the methods describes above as all of the methods result in substantially the same battery. An electrolyte, 42, fills the pores of all of the layers of separator/binder between the electrodes. Conductors 44 and 46 connect all of the anodes and cathodes, respectively, and extend out of sealed container 48 as electrical leads at 50 and 52. Various means for connecting the anodes and cathodes are known in the art. One method of connecting the electrodes (not shown) is to spot-weld a nickel mesh to the electrode ends which extend from the electrode stack.

Various containers are known in the art. One example of a container is an aluminum foil bag, laminated, at least on an internal surface, with a polymer such as PE or PP.

As discussed above, a battery of the invention can have a cylindrical (wound) structure. A cylindrical or hexahedron shaped core is preferred for winding the coated electrodes about. The three methods of fabrication described for prismatic batteries can be used to fabricate cylindrical batteries. One example of each of the methods is described below. One skilled in the art can devise alternative variations to achieve the same results.

Figure 10A:
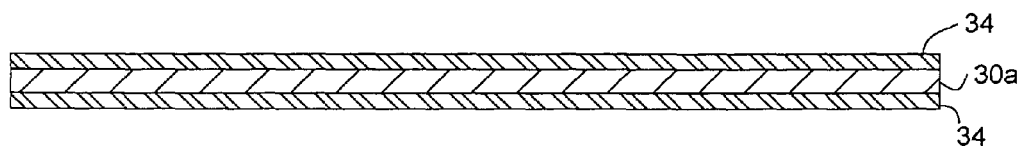
FIGS. 10a, 10b and 10c are drawings for describing fabricating steps carried out for a first method of fabrication of the invention for a cylindrical battery.
Figure 10B:
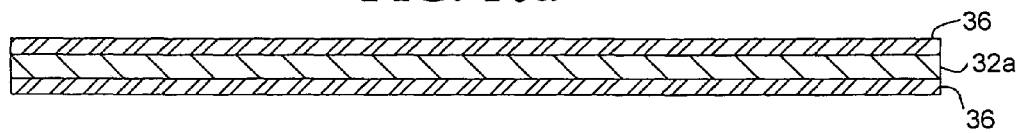
Figure 10C:
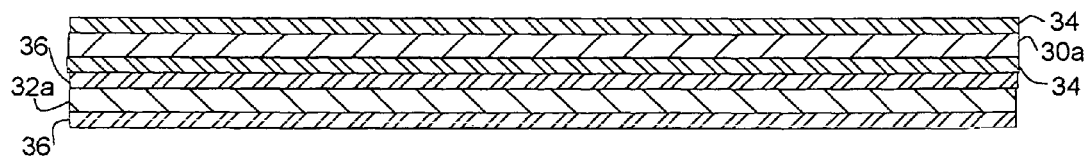

In FIG. 10a an elongated anode 30a is coated on both sides with the first separator/binder 34 and dried. Elongated cathode 32a is coated on both sides with the second separator/binder 36, FIG. 10b. While the second separator/binder 36 is still at least tacky the coated anode and cathode are rolled about a core in coil form as shown in FIG. 2 and dried. The dried cylindrically shaped battery is bound in that shape by the two separator/binder layers without any additional structure.

Figure 11:
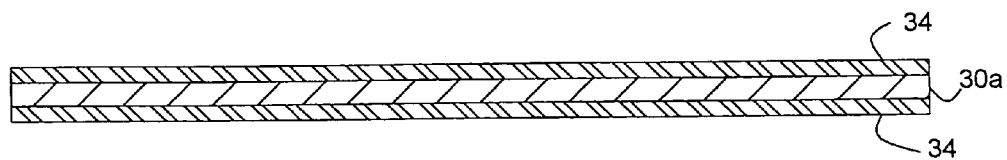
FIG. 11 is a drawing for describing fabricating steps carried out for a second method of fabrication of the invention for a cylindrical battery.

In the second method of fabricating a cylindrical battery of the invention, described with reference to FIG. 11, the battery is fabricated by coating an elongated anode, 30a, on both sides with the first separator/binder 34 and dried. In a second step the coated elongated anode is rolled with an elongated non-coated cathode about a core. A separation between the first separator/binder 34 and the non-coated surface of the elongated cathode is infiltrated with the second separator/binder 36 such as by immersion. In a final step, the coiled anode and cathode are dried to bind each anode to each cathode as in FIG. 2.

Figure 12A:
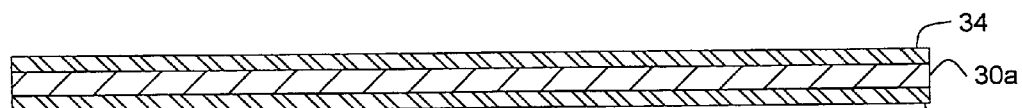
FIGS. 12a, 12b and 12c are drawings for describing fabricating steps carried out for a third method of fabrication of the invention for a cylindrical battery.
Figure 12B:
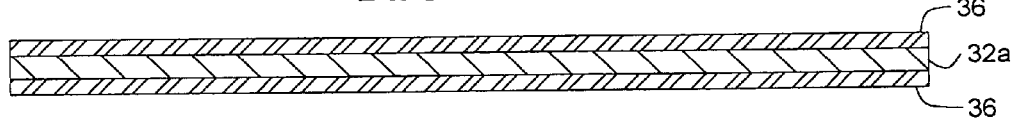
Figure 12C:
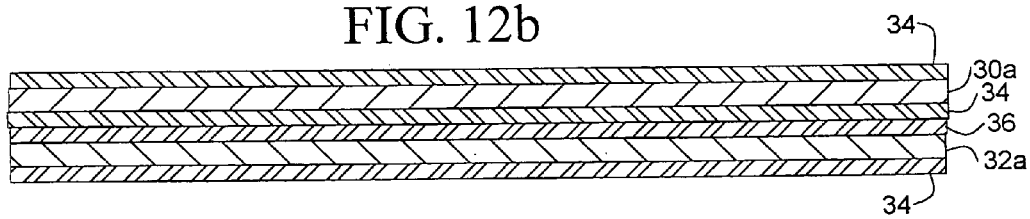

A third method of fabricating a cylindrical battery of the invention is described with reference to FIGS. 12a-12c. In FIG. 12a, an elongated anode 30a is coated on both sides with the first separator/binder 34 and dried. In a second step, FIG. 12b, elongated cathode 32a is coated on both sides with the second separator/binder 36 and dried. The coated elongated anode and cathode are stacked and rolled about a core in coil form. The rolled electrodes are infiltrated, such as by immersion, with the solvent $S_2$ of polymer $P_2$ so as to dissolve at least a surface portion of the polymer $P_2$ without any effect on the first separator/binder 34 layer having polymer $P_1$. FIG. 2 shows the completed structure having a continuous anode 30a and a continuous cathode 32b with one layer of separator/binder 34 and one layer of separator/binder 36 between them. The structure is bound in the coil shape by the dried polymers without any external structure. Other procedures for producing cylindrical batteries using the three general methods of fabrication are also possible.

Lithium-ion batteries fabricated with use of the above three methods have numerous advantages over batteries fabricated by known methods such as using a continuous film or sheet formed of a polymer. Examples of the advantages of the present invention are:

1) Many different polymers can be used for the separating and binding layers without consideration of their mechanical properties. In batteries fabricated using a continuous film formed of a polymer only certain polymers having certain mechanical properties can be used.

2) Previous concerns for "pin holes" in a continuous polymeric film is not a concern with the present method. Even if a "pin hole" would be present in one of the layers, the second layer would prevent physical contact of the anode and cathode.

3) The batteries of the present invention require no external structure to hold the electrodes in position. The layers of polymeric material bind the electrodes. As a result, no steel case is required which increases the thickness and weight of the resultant battery.

4) The separator/binder layers can be very thin, since mechanical strength and pin hole problems are not the concern, thereby a very thin battery can be constructed.

5) Most of the fabrication can take place outside a dry room. Polymer films for battery fabrication of the prior art are usually handled in a dry room so as to prevent the absorption of moisture in the film, which is difficult to remove after fabrication. In the present invention only the final steps are carried out in a dry room.

6) In comparison with batteries having a polymer film in sheet form with layers of polymers on each face provided for binding between the film and each electrode, the present battery has one less interface between polymeric material layers. Imperfect interfaces can result in an increase of electrical resistance.

7) Since the layers of separator/binder fill substantially the entire space between the electrodes, the liquid electrolyte is absorbed in a sponge-like manner and is substantially contained, thus no extra liquid electrolyte is required.

8) The present method can be used on any known electrode materials.

9) Since the two separator/binder layers are intimately bound to the electrode surfaces, excellent wetability of the electrode surfaces is achieved.

10) The battery is a solid bound structure with substantially no voids intermediate the anodes and cathodes.

11) The binding effect is better with the two separator/binder layers compared with binding carried out on the surface of the conventional sheet separator film.

Experimental testing was carried out on batteries fabricated by the three methods of fabrication of the invention. Testing conditions and experimental results are shown graphically in FIGS. 13 to 29.

In all of the experiments having a prismatic form, the foil of the cathodes had a dimension of 4 cm.×3.8 cm. with an active cathode material on each foil surface covering an area 3 cm.×3.8 cm. The foil of the anodes had a dimension of 4 cm.×4 cm. with an active anode material on each foil surface covering an area 3 cm.×4 cm.

Also in all of the experiments the cathode foil was aluminum coated with a cathode active material of $LiCoO_2$. It should be noted that other cathode materials are possible. The anode foil was copper coated with an anode active material of carbonaceous graphite, similarly, other anode materials are possible.

Example 1 was carried out using a battery fabricated by the first method of fabrication. The first separator/binder was prepared by dissolving 0.5 gm of PVC in 20 gm of THF, and then adding 9.5 gm of glass particles prepared as described above and stirred until the desired homogeneity, described above, was obtained. The second separator/binder was prepared by dissolving 1 gm of PEO in 30 gm of methanol, and then adding 5 gm of the glass particles. The mixture was stirred to the same desired homogeneity.

The first separator/binder was applied to both sides of the cathodes, using the bar coating process, to a thickness of about 50 μm and dried by evaporating the THF. The second separator/binder was then applied to both sides of the anodes, using the bar coating process, to a thickness of about 50 μm. Prior to the complete evaporation of the solvent methanol the anodes and cathodes were stacked as shown in FIG. 1. The electrode stack consisted of 11 cathodes and 10 anodes. A nickel mesh was spot welded on the extending anode side and on the extending cathode side to serve as current collectors for the resultant battery. The electrode stack was dried under vacuum at 120 C. for 8 hours and then packed in a polymer-laminated aluminum foil bag. A liquid electrolyte, (1 M $LiPF_6$ in EC/DMC wt ratio 1:1) was added to the battery pack and the pack sealed. The electrolyte component EC/DMC is ethylene carbonate/dimethyl carbonate. The resultant battery was then pressed with one-ton pressure for 10 minutes just prior to testing. The steps of adding the electrolyte and sealing the pack were carried out in a dry room.

Figure 13:
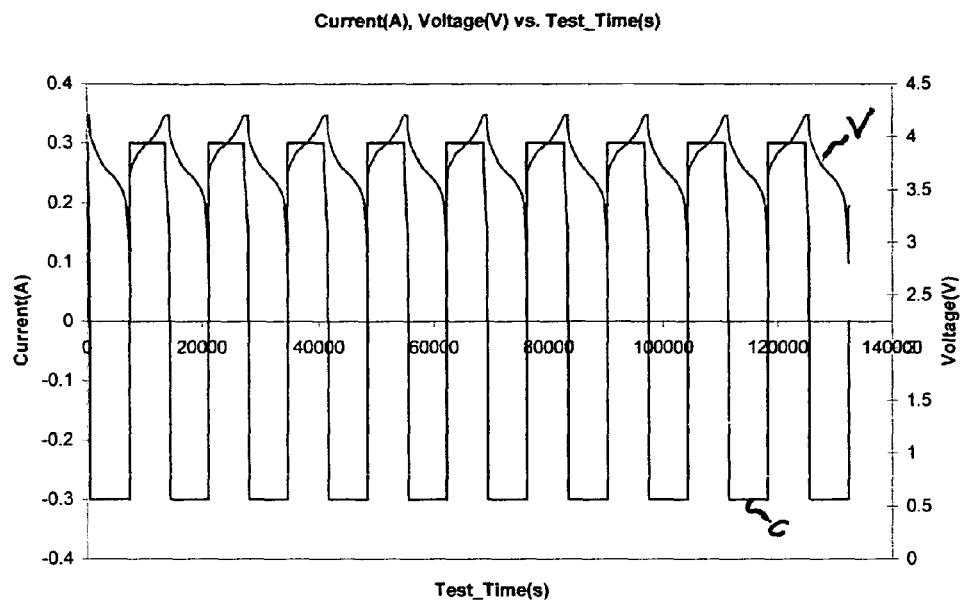
FIG. 13 is a graph for showing a first set of testing conditions carried out on a prismatic battery of the invention fabricated by method 1.
Figure 14:
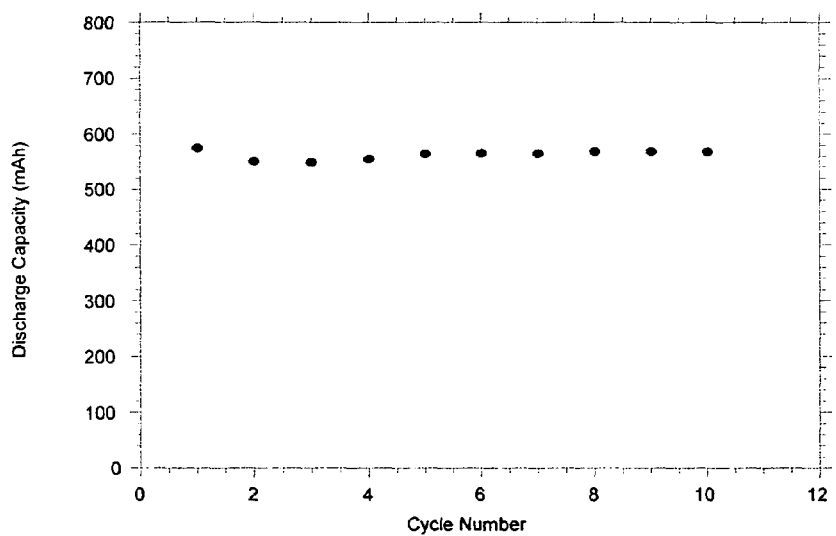
FIG. 14 is a graph for showing the results of the test carried out using the conditions shown in FIG. 13.
Figure 15:
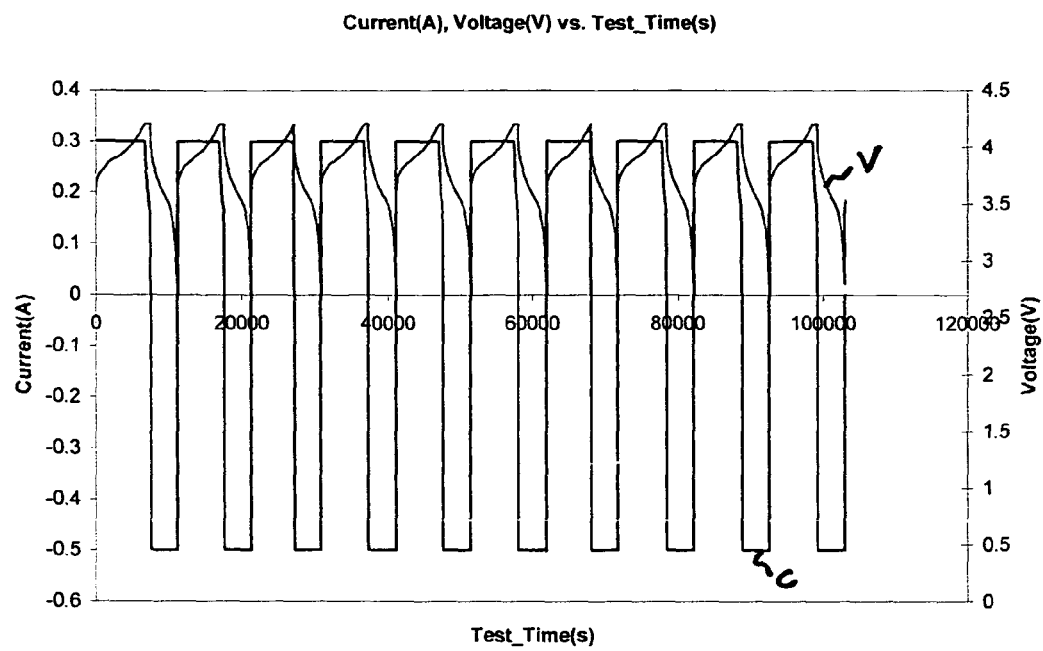
FIG. 15 is a graph for showing a second set of testing conditions different from the set of FIG. 13 carried out on the same prismatic battery of the invention fabricated by method 1.

The experimental testing to determine discharge capacity was carried out as follows and is depicted graphically in FIG. 13:

1) The battery was charged and then discharged at a current of 0.15A for a first cycle, then charged and discharged for 10 cycles. Charging conditions were 0.3A constant charge to 4.2V, then constant voltage charge at 4.2V until the current <0.15A. Discharging conditions were 0.3A constant discharge until the voltage=2.8V. The current of 0.3A results in a full charge or full discharge being carried out in about 2 hours. A charging/discharging rate of such is referred to as a C-rate of C/2. In FIG. 13, the first charge/discharge cycle is not shown. Current (amps) is indicated by the line C and voltage (volts) is indicated by the line V. The horizontal axis indicates test time expressed in seconds. The results of the discharge capacity test are shown in FIG. 14. The horizontal axis indicates the cycle number and the vertical axis indicates the discharge capacity expressed in mAh. A discharge capacity of about 550 mAh resulted for each of the cycles.

In example 2, a second discharge capacity test was carried out on the same battery as example 1 using a different C-rate for discharging. The testing conditions are depicted graphically in FIG. 15. 10 charging/discharging cycles were carried out at a discharge C-rate of C/1, that is a current of 0.5A, and a charging C-rate of C/2, that is a current of 0.3A. As in graph 13, current (amps) is indicated by the line C and voltage (volts) is indicated by line V. The horizontal axis indicates time in seconds.

Figure 16:
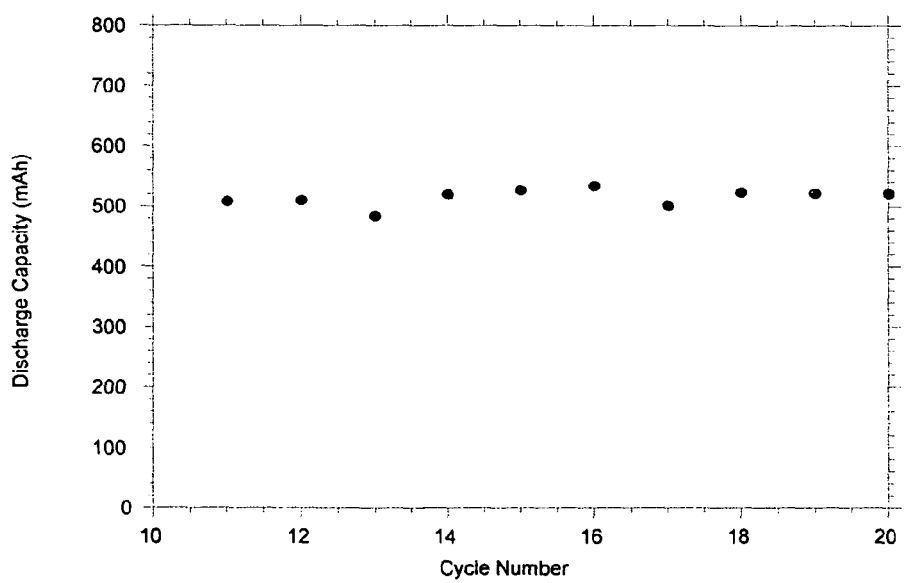
FIG. 16 is a graph for showing the results of the test carried out using the conditions shown in FIG. 15.
Figure 17:
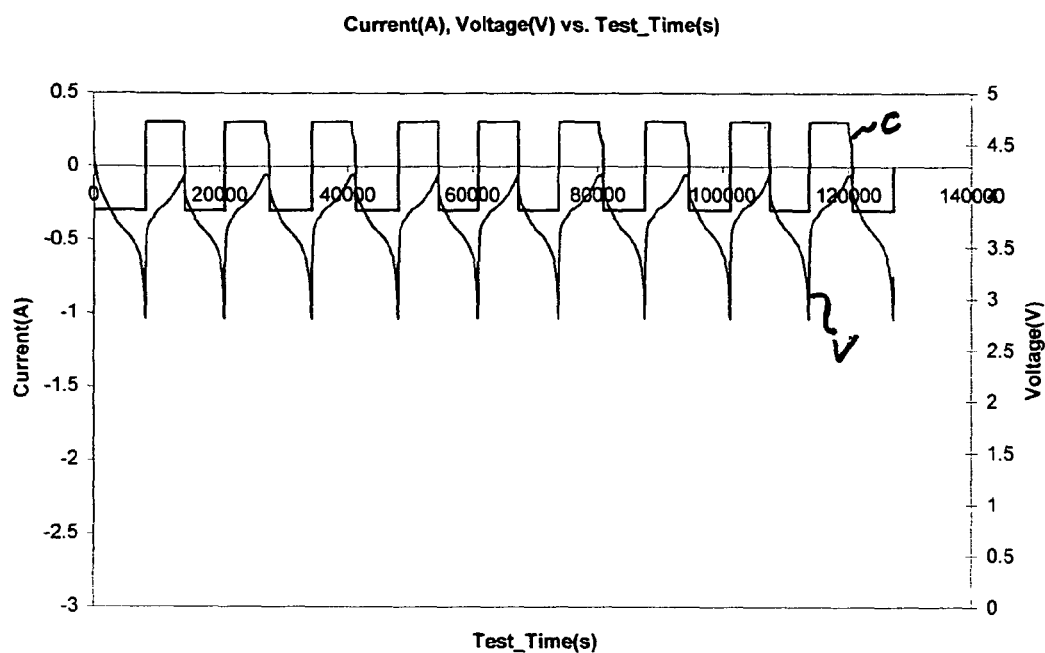
FIGS. 17-24 are graphs for showing a third set of testing conditions and corresponding results, for a prismatic battery fabricated by the first method, but using a differing separator/binder than that of the battery of FIGS. 13-16.
Figure 18:
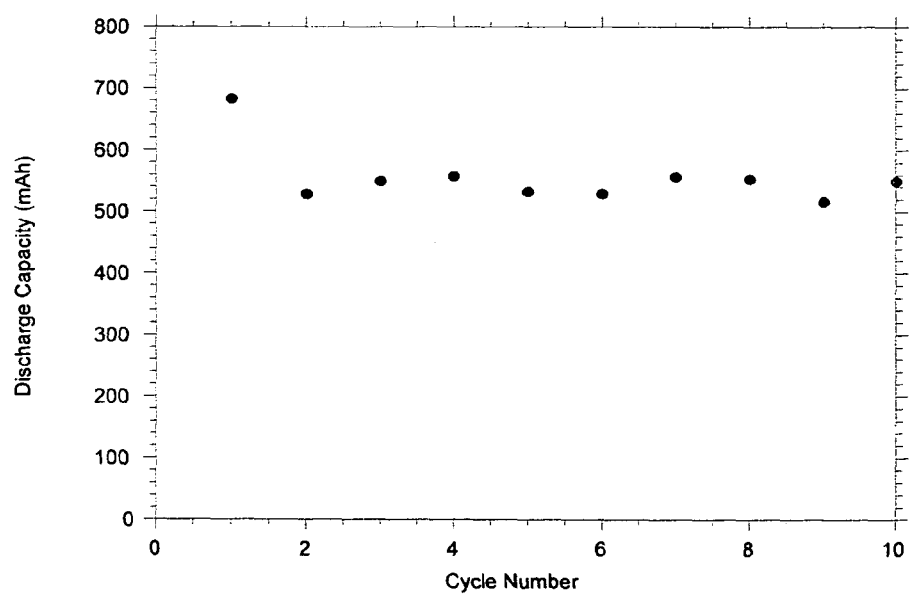
Figure 19:
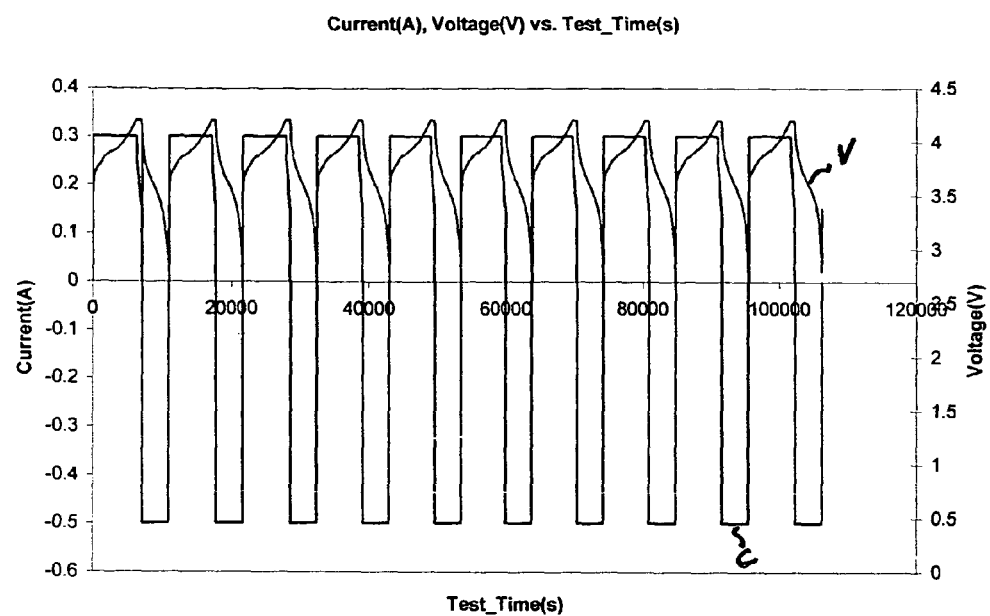
Figure 20:
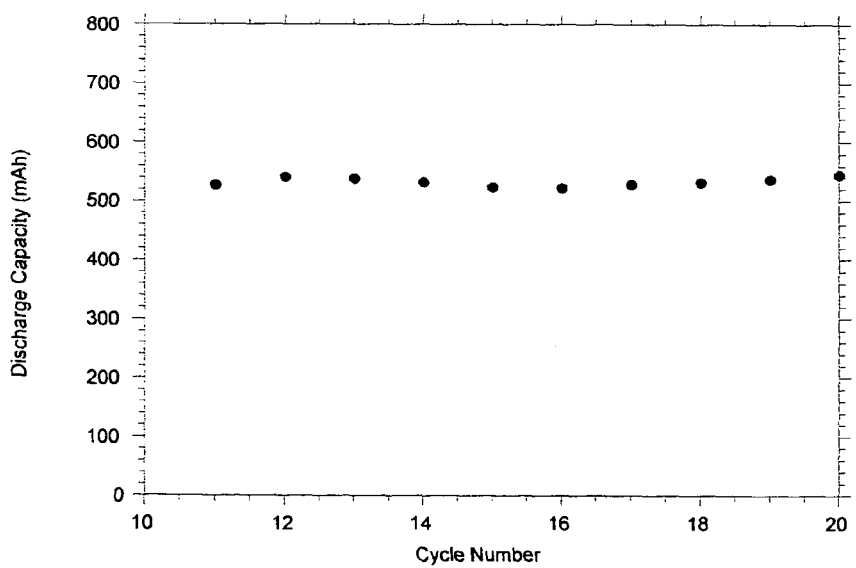
Figure 21:
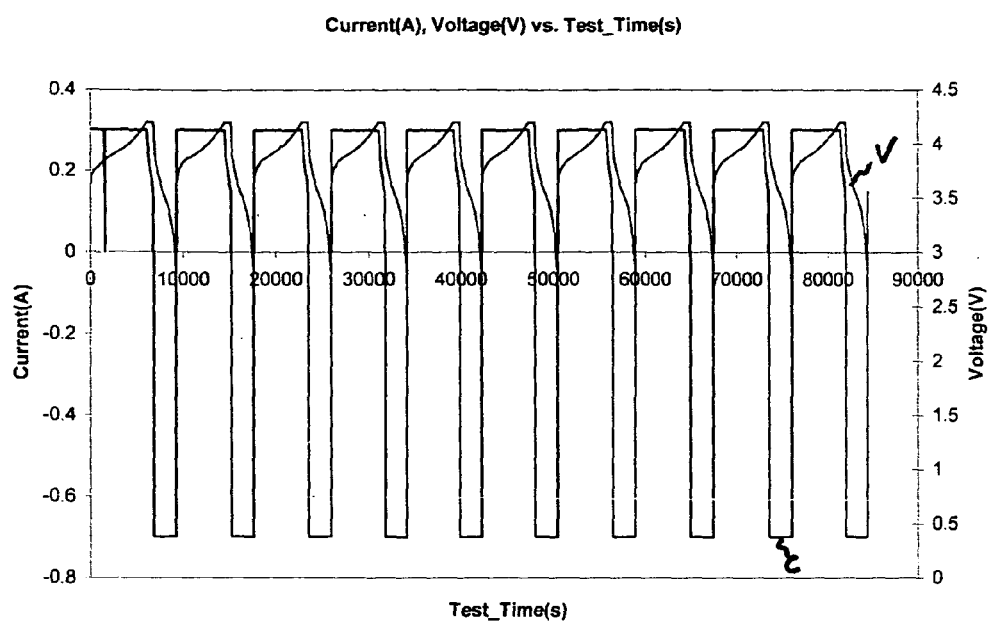
Figure 22:
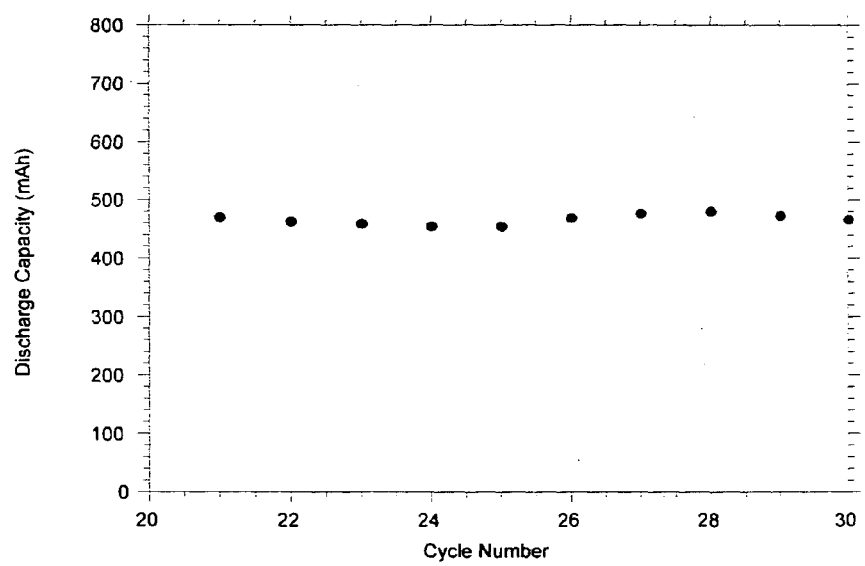
Figure 23:
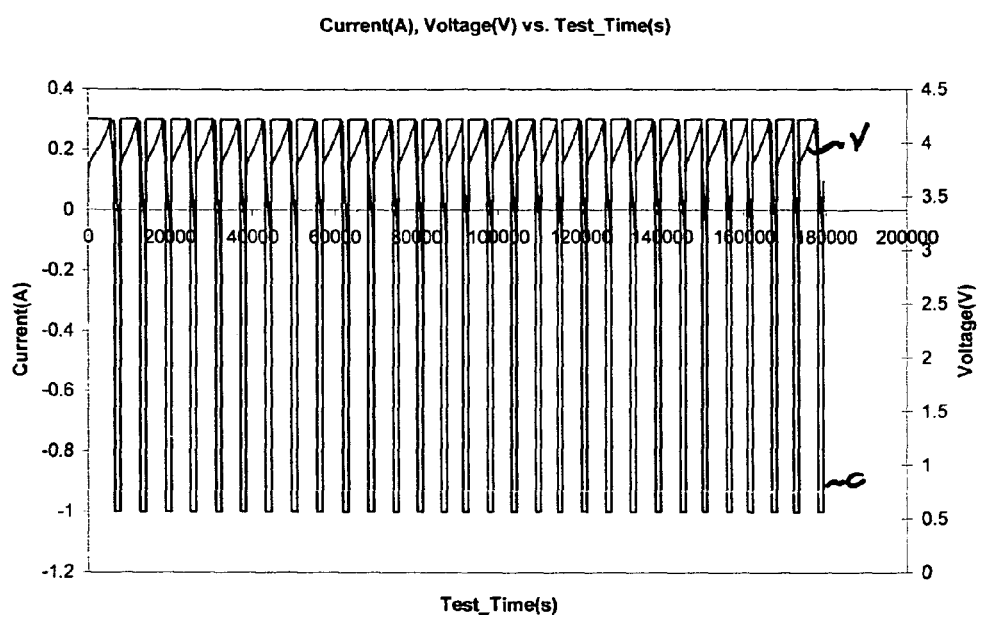
Figure 24:
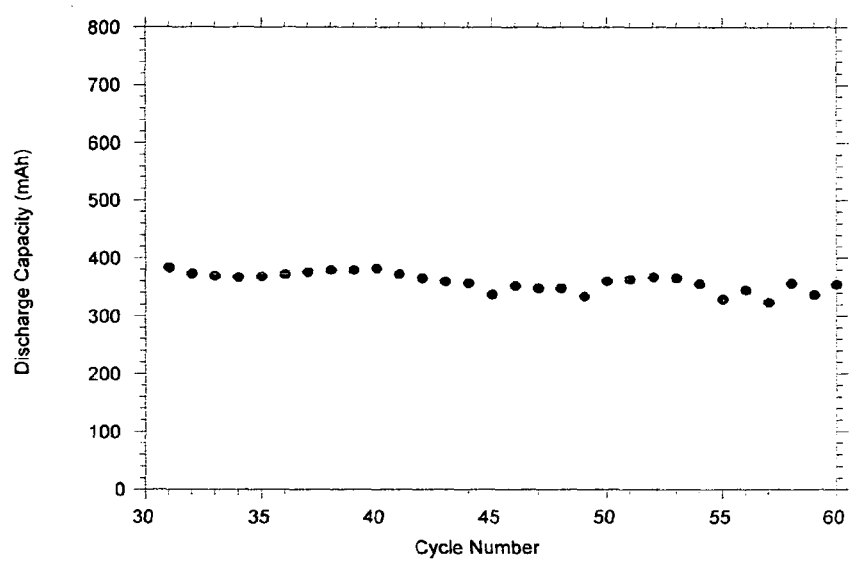

The results of the discharge capacity test are shown in FIG. 16. A discharge capacity of about 520 mAh resulted for each of the cycles. The cycles are indicated as cycles 11 through 20 as the second test was carried out on the same battery as the first test.

In example 3, a third discharge capacity test was carried out using a battery fabricated by the first method of fabrication. All of the fabricating steps were the same as Example 1 except the polymer $P_1$ was prepared by dissolving 0.5 gm of copolymer PE/PP (PE content about 60%) in 20 gm of Heptane, then mixing in 9.5 gm of the glass particles described above.

The following testing conditions, table III, were carried out.

TABLE III

| Test | Cycle | Charging Conditions | Discharging Conditions |
|------|-------|---------------------|------------------------|
| A | 1–10 | 300 mA constant charge to 4.2 V then constant voltage of 4.2 V until current < .15A | 300 mA constant discharge until voltage was 2.8 V |
| B | 11–20 | " | 500 mA constant discharge until voltage 2.8 V |
| C | 21–30 | " | 700 mA constant discharge until voltage 2.8 V |
| D | 31–60 | " | 1A constant discharge until voltage 2.8 V |

The test conditions are depicted graphically, and the discharge capacities for tests A, B, C and D are indicated graphically in FIGS. 17-24. In FIGS. 17, 19, 21 and 23 current (amps) is indicated by the line C, and voltage (volts) is indicated by the line V. The various results can be seen in FIGS. 18, 20, 22 and 24.

In a fourth example, the battery was fabricated by the first method of fabrication. All of the fabrication steps were the same as example 1 except the number of electrode layers and the polymers were different. The test battery consisted of five cathodes and four anodes. The first separator/binder was prepared by dissolving 0.5 gm of polystyrene in 20 gm of THF (tetrahydrofuran) then adding 5 gm of ball milled borosilicate fibers. The second separator/binder was prepared by dissolving 1 gm of PVP in 20 gm of methanol then adding 9.5 gm of ball milled borosilicate fibers.

Figure 25:
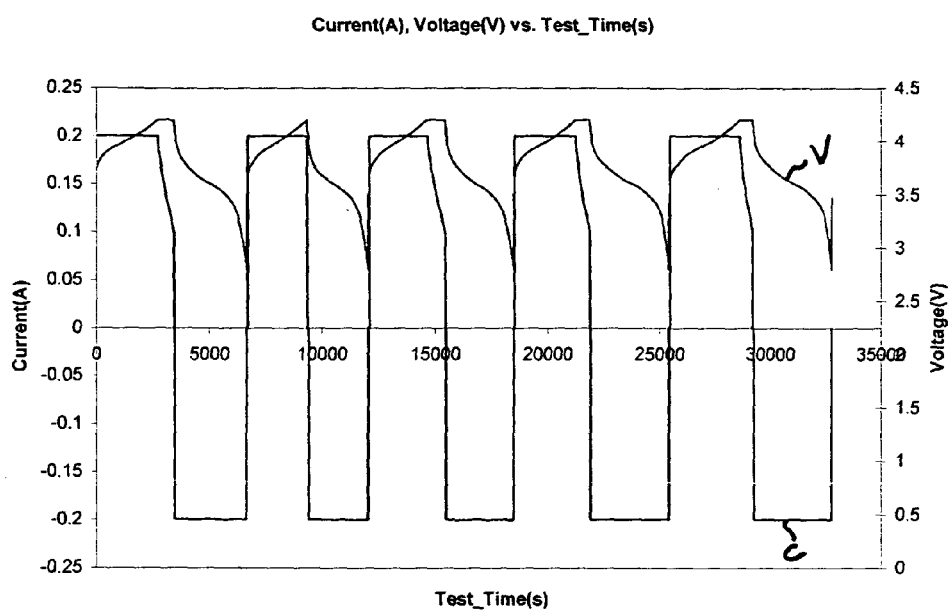
FIG. 25 is a graph for showing a fourth set of testing conditions carried out on a battery of the invention fabricated by method 1, but using differing separators/binders then previous method 1 examples.

Testing conditions are depicted graphically in FIG. 25. The battery was first charged and discharged at a current of 0.07 amps. After the first cycle the battery was charged at a current of 0.2 amp (approximately C/1 in C-rate) with a constant voltage charge of 4.2V, and a discharge current of 0.2 amp.

Figure 26:
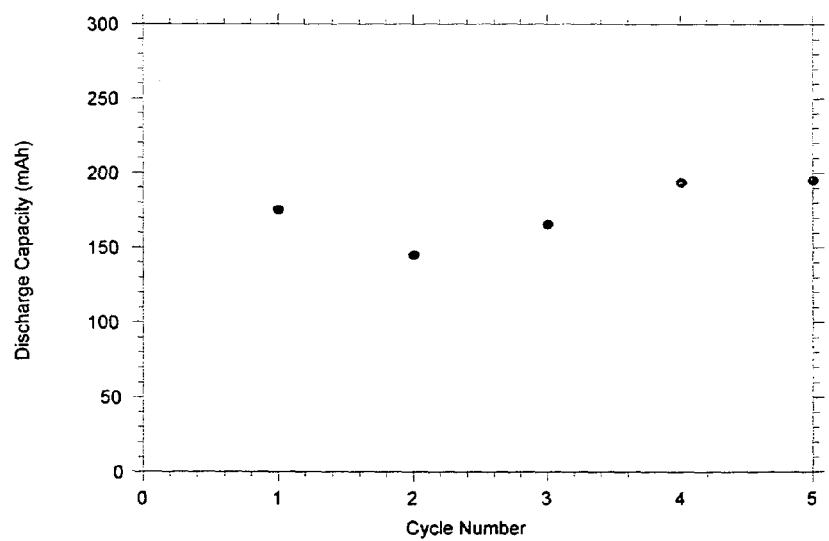
FIG. 26 is a graph for showing the results of the test carried out using the conditions shown in FIG. 25.

The results of 5 cycles of the test are shown graphically in FIG. 26.

In a fifth example, the battery consisted of one anode and one cathode wound about a hexahedron shaped core and fabricated by the second method of fabrication. The cathode dimensions were 3.8 cm.×25.2 cm. with an active material coating of 3.8 cm.×24.2 cm. on one side and 3.8 cm.×18.2 cm. on the other side. The anode had dimensions of 4 cm.×26.3 cm. with active material of 4 cm.×25.3 cm. on one side and 4 cm.×20.3 cm. on the other side. The core was fabricated using copper foil. The first separator/binder was prepared by dissolving 0.5 gm of PVC in 20 gm of THF (tetrahydrofuran) then adding 9.5 gm of ball milled borosilicate fibers. After coating and drying the first separator/binder on both sides of the cathode, both the cathode and uncoated anode were wound on the core. The wound electrodes were then dipped in a liquid containing 1 gm of PEO, 30 gm of methanol and 5 gm of ball milled borosilicate for about 2 minutes. After removal from the liquid the assembly was dried in a vacuum oven at 120 C. for 12 hours. In a dry box, the electrolyte 1M $LiPF_6$ in EC/DMC wt. ratio 1:1 was added.

Figure 27:
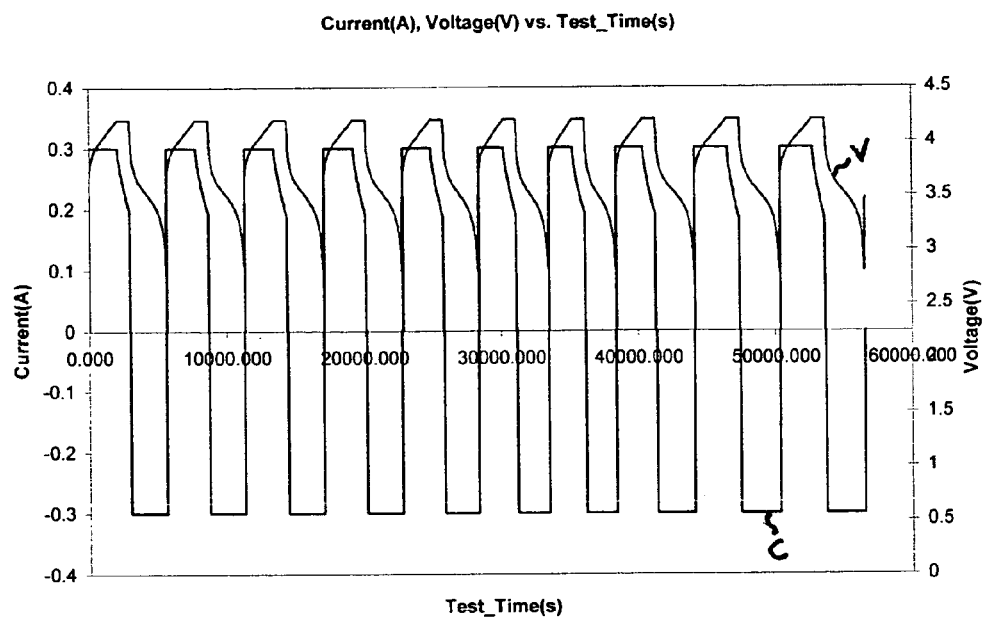
FIG. 27 is a graph for showing a fifth set of testing steps carried out on a wound type battery of the invention fabricated by method 2.
Figure 28:
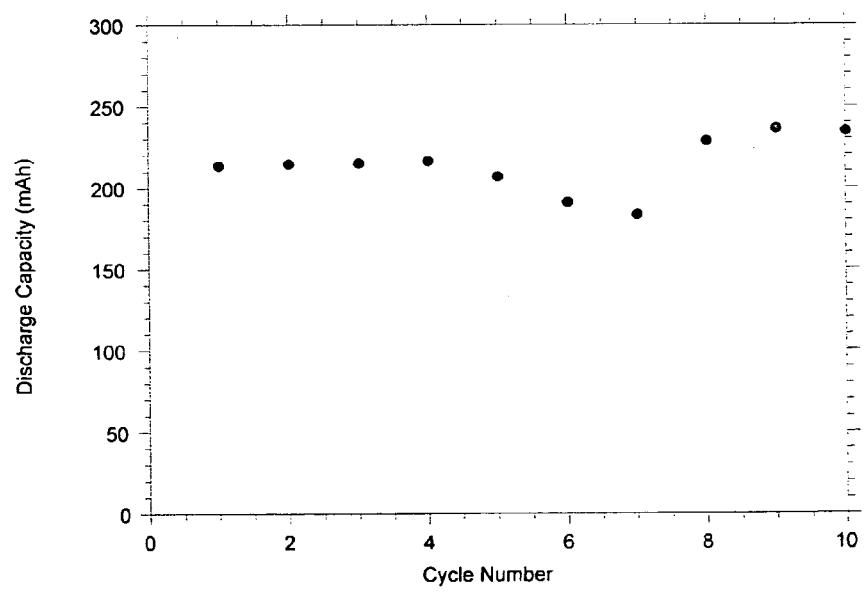
FIG. 28 is a graph for showing the results of the test carried out using the conditions shown in FIG. 27.

FIG. 27 graphically depicts the testing conditions. The battery was first charged and discharged at a current of 0.15A. The battery was then charged and discharged for 10 cycles with charging at a current of 0.3A (approximately C/1-in C-rate) with a constant voltage charge at 4.2 volts, and a discharge current of 0.3A. The performance of the battery is shown graphically in FIG. 28.

In a sixth example, the battery consisted of one anode and one cathode wound about a cylinder shaped core and fabricated by the third method of fabrication. The cathode had dimensions of 3.8 cm.×24 cm. with active materials of 3.8 cm.×23 cm. on one side and 3.8 cm.×21.7 cm. on the other side. The anode had dimensions of 4 cm.×24 cm. with active material of 4 cm.×23 cm. on one side and 4 cm.×19.2 cm. on the other side. A glass fiber reinforced cylinder was used as the core.

The cathode was coated on both sides with a composition consisting of 1 gm of PE/PP, 40 gm of TCE, and 5 gm of ball milled borosilicate fibers. The anode was coated on both sides with a composition consisting of 1 gm of PEO, 30 gm of methanol, and 5 gm of ball milled borosilicate fibers. After coating and drying the anode and cathode coatings, the anode and cathode were wound on the core. The assembly was then immersed in the solvent of the second separator/binder, that is methanol, so as to dissolve at least a surface layer of the second separator/binder. The assembly was then dried in a vacuum oven at 120 C. for 12 hours. After drying the assembly was transferred to a dry box where a liquid electrolyte, 1M $LiPF_6$ in EC/DMC wt. ratio 1:1, was added.

Figure 29:
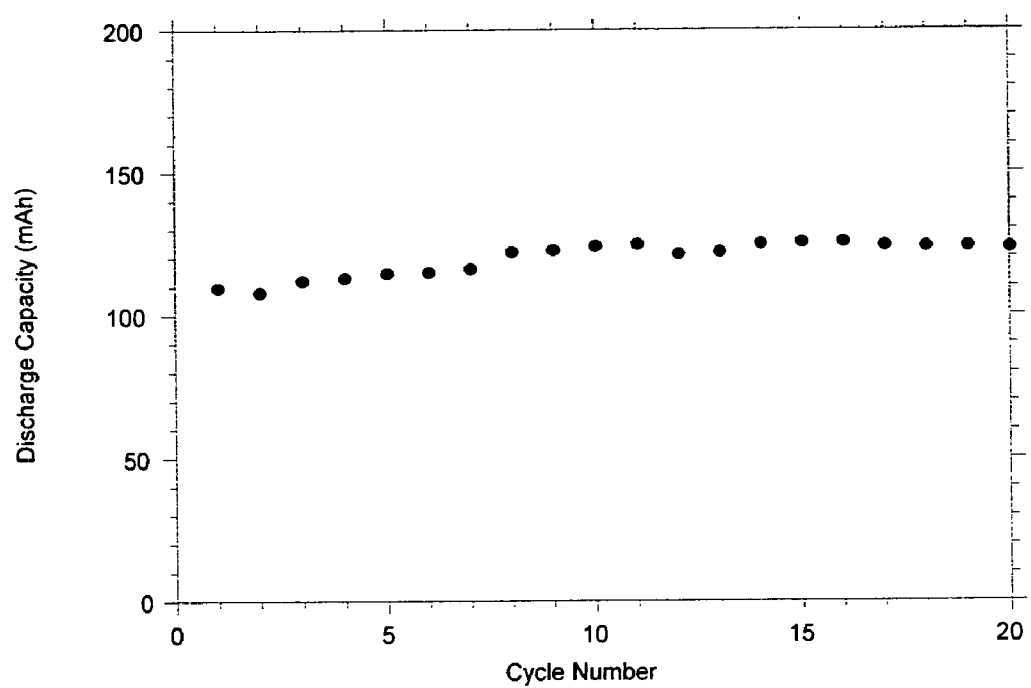
FIG. 29 is a graph for showing the results of a sixth test carried out on a cylindrical (wound) battery of the invention fabricated by method 3.

The battery was cycled between 4.2 and 3.0 volts at a constant current of 0.05A. The capacity versus cycle number for the first 20 cycles of testing are shown in FIG. 29.

While specific material, dimensions, fabricating steps, etc. have been set forth for purposes of describing embodiments of the invention, various modifications can be resorted to, in light of the above teachings, without departing from Applicants' novel contributions; therefore in determining the scope of the present invention, reference shall be made to the appended claims.

What is claimed is:

1. A rechargeable battery, comprising
at least one anode;
at least one cathode, each said cathode being in opposing spaced relationship to each said anode;
two layers of differing porous separators/binders intermediate each opposing anode and cathode to maintain said opposing spaced relationship;
a non-aqueous electrolyte filling said pores of said layers of separator/binder;
wherein: a first separator/binder comprises a mixture of polymer $P_1$ and a particulate material $M_1$,
a second separator/binder comprises a mixture of polymer $P_2$ and a particulate material $M_2$,
polymer $P_1$ is soluble to a degree for forming a polymeric solution in a solvent $S_1$,
polymer $P_2$ is soluble to a degree for forming a polymeric solution in a solvent $S_2$,
polymer $P_1$ remains solid in the presence of solvent $S_2$,
polymer $P_2$ remains solid in the presence of solvent $S_1$,
particulate material $M_1$ remains solid in the presence of solvent $S_1$,
particulate material $M_2$ remains solid in the presence of solvent $S_2$, and
said opposing spaced relationship of each cathode to each anode is maintained by
each anode being bound to the first separator/binder, the first separator/binder being bound to the second separator/binder and the second separator/binder being bound to each cathode.

2. A rechargeable battery according to claim 1, wherein said at least one anode and said at least one cathode are stacked as a prismatic stacked structure.

3. A rechargeable battery according to claim 2, wherein a plurality of anodes and cathodes are stacked, and the stacking sequence is a repetition of (anode)-(first separator/binder)-(second separator/binder)-(cathode)-(first separator/binder)-(second separator/binder)-(anode).

4. A rechargeable battery according to claim 2, wherein a plurality of anodes and cathodes are stacked; and
the stacking sequence is a repetition of (anode)-(first separator/binder)-(second separator/binder)-(cathode)-(second separator/binder)-(first separator/binder)-(anode).

5. A rechargeable battery according to claim 2, wherein a plurality of anodes and cathodes are stacked, and the stacking sequence is a repetition of (cathode)-(first separator/binder)-(second separator/binder)-(anode)-(second separator/binder)-(first separator/binder)-(cathode).

6. A rechargeable battery according to claim 1, wherein said battery has one anode and one cathode, and
said anode and cathode are formed as a cylindrical wound structure.

7. A rechargeable battery according to claim 6, further comprising
a core upon which said anode and cathode are wound to form said cylindrical wound structure.

8. A rechargeable battery according to claim 7, wherein the shape of the core is one selected from: a cylinder and a hexahedron.

9. A rechargeable battery according to claim 1, wherein solvent $S_1$ is of the hydrophobic type, and
solvent $S_2$ is of the hydrophilic type.

10. A rechargeable battery according to claim 9, wherein the hydrophobic solvent $S_1$ is one selected from: heptane, tetrahydrofuran, DMF, and DMSO, and
the hydrophilic solvent $S_2$ is one selected from: methanol, ethanol, and methanol/chloroform.

11. A rechargeable battery according to claim 1, wherein solvent $S_1$ and solvent $S_2$ are of the hydrophobic type, or
solvent $S_1$ and solvent $S_2$ are of the hydrophilic type.

12. A rechargeable battery according to claim 11, wherein the hydrophobic solvents $S_1$ and $S_2$ are selected from: heptane, tetrahydrofuran, DMF, and DMSO, or
the hydrophilic solvents $S_1$ and $S_2$ are selected from: methanol, ethanol, and methanol/chloroform.

13. A rechargeable battery according to claim 1, wherein polymer $P_1$ is at least one selected from: PE, PP, PVC, polystyrene, and PAN; and
polymer $P_2$ is at least one selected from: PEO, PPO, polycarbonate, PMMA, and PVP.

14. A rechargeable battery according to claim 13 wherein polymer $P_1$ and/or polymer $P_2$ are/is a combination of two or more polymer materials.

15. A rechargeable battery according to claim 1, wherein particulate materials $M_1$ and $M_2$ are selected from: silicon dioxide, magnesium oxide, calcium oxide, strontium oxide, barium oxide, boron oxide, aluminum oxide, silicon oxide; synthetic or natural zeolites,
borosilicate, calcium silicate, aluminum polysilicates, wood flours, glass microbeads, glass hollow microspheres, polyester fibers, nylon fibers, rayon fibers, acetate fibers, acrylic fibers, polyethylene fibers, polypropylene fibers, polyamide fibers, polybenzimidazole fibers, borosilicate glass fibers, and wood fibers.

16. A rechargeable battery according to claim 15, wherein particulate materials $M_1$ and $M_2$ are the same or $M_1$ and $M_2$ are different.

17. A rechargeable battery according to claim 15 wherein particulate material $M_1$ and/or particulate material $M_2$ are/is a combination of two or more particulate materials.

18. A rechargeable battery according to claim 1, wherein
in the first separator/binder the percent by weight of the particulate material is between 50% and 98%; and
in the second separator/binder the percent by weight of the particulate material is between 50% and 98%.

19. A rechargeable battery according to claim 1, wherein
in the first separator/binder the percent by weight of the particulate material is between 80% and 97%; and
in the second separator/binder the percent by weight of the particulate material is between 70% and 92%.

20. A rechargeable battery according to claim 1, wherein the first separator/binder is of a thickness in the range of 10-200 μm, and
the second separator/binder is of a thickness in the range of 10-200 μm.

21. A rechargeable battery according to claim 1, wherein the first separator/binder is of a thickness in the range of 30-60 μm, and
the second separator/binder is of a thickness in the range of 30-60 μm.

* * * * *